(12) United States Patent  
Phillips et al.

(10) Patent No.: US 8,799,496 B2  
(45) Date of Patent: Aug. 5, 2014

(54) SYSTEM AND METHOD FOR VIDEO DISPLAY TRANSFER BETWEEN VIDEO PLAYBACK DEVICES

(75) Inventors: Andrew V. Phillips, Raleigh, NC (US); Scott Curtis, Durham, NC (US)

(73) Assignee: Eloy Technology, LLC, Wilmington, DE (US)

( * ) Notice: Subject to any disclaimer, the term of this patent is extended or adjusted under 35 U.S.C. 154(b) by 778 days.

(21) Appl. No.: 12/838,532

(22) Filed: Jul. 19, 2010

(65) Prior Publication Data

US 2012/0117193 A1    May 10, 2012

Related U.S. Application Data

(60) Provisional application No. 61/227,189, filed on Jul. 21, 2009.

(51) Int. Cl.
```
G06F 15/16      (2006.01)
H04W 36/00      (2009.01)
H04W 36/36      (2009.01)
H04N 1/327      (2006.01)
```

(52) U.S. Cl.
CPC ........... *H04W 36/36* (2013.01); *H04N 1/32767* (2013.01)
USPC .......................................... 709/231; 455/439

(58) Field of Classification Search
USPC .......................................... 709/231; 455/440
See application file for complete search history.

(56) References Cited

U.S. PATENT DOCUMENTS

| | | | |
|---|---|---|---|
| 5,565,910 A | 10/1996 | Rowse et al. | |
| 6,037,981 A * | 3/2000 | Wilson et al. | 375/240.12 |
| 7,161,557 B2 | 1/2007 | Thornton | |
| 7,277,559 B2 * | 10/2007 | Matsunaga et al. | 382/103 |
| 7,324,857 B2 | 1/2008 | Goddard | |
| 7,457,511 B2 | 11/2008 | Putterman et al. | |
| 7,650,621 B2 | 1/2010 | Thomas et al. | |
| 7,983,614 B2 * | 7/2011 | Dunko et al. | 455/41.1 |
| 2003/0068155 A1 | 4/2003 | Vasilevsky et al. | |
| 2005/0015805 A1 | 1/2005 | Iwamura | |
| 2005/0221829 A1 * | 10/2005 | Nishida et al. | 455/440 |
| 2005/0283344 A1 | 12/2005 | Moscovitch | |
| 2005/0286546 A1 | 12/2005 | Bassoli et al. | |
| 2006/0256959 A1 * | 11/2006 | Hymes | 379/433.04 |
| 2007/0093199 A1 * | 4/2007 | Bowen et al. | 455/3.02 |
| 2007/0123308 A1 * | 5/2007 | Kim et al. | 455/566 |

(Continued)

OTHER PUBLICATIONS

"Streamium," Wikipedia, at <http://en.wikipedia.org/wiki/Streamium>, from the Internet Archive, dated Sep. 16, 2008, last modified Jul. 15, 2008, printed Sep. 20, 2012, 6 pages.

(Continued)

*Primary Examiner* — Shirley Zhang

(57) ABSTRACT

Systems and methods are disclosed for transferring video display between video playback devices. In one embodiment, a mobile, or handheld, device receives user input that initiates transfer of display of video content to the mobile device from a desired renderer located proximate to the mobile device. The mobile device then causes transfer of display of the video content to the mobile device from the desired renderer. In another embodiment, a mobile, or handheld, device receives user input that initiates transfer of display of video content from the mobile device to a desired renderer located proximate to the mobile device. The mobile device then causes transfer of display of the video content from the mobile device to the desired renderer.

22 Claims, 12 Drawing Sheets

(56) References Cited

U.S. PATENT DOCUMENTS

| | | | |
|---|---|---|---|
| 2007/0136488 A1* | 6/2007 | Cho et al. | 709/231 |
| 2007/0271514 A1 | 11/2007 | O'Neal et al. | |
| 2008/0052606 A1 | 2/2008 | Alstrup et al. | |
| 2008/0081558 A1* | 4/2008 | Dunko et al. | 455/41.1 |
| 2008/0141316 A1 | 6/2008 | Igoe et al. | |
| 2008/0231546 A1 | 9/2008 | Li | |
| 2009/0028142 A1 | 1/2009 | Schmidt et al. | |
| 2009/0070840 A1* | 3/2009 | Kamimaki et al. | 725/114 |
| 2009/0102983 A1 | 4/2009 | Malone et al. | |
| 2009/0295679 A1 | 12/2009 | Lida et al. | |
| 2009/0295680 A1 | 12/2009 | Lida et al. | |
| 2009/0296002 A1 | 12/2009 | Lida et al. | |
| 2010/0060549 A1 | 3/2010 | Tsern | |
| 2010/0060572 A1 | 3/2010 | Tsern | |
| 2010/0161822 A1* | 6/2010 | Palm et al. | 709/231 |
| 2010/0180055 A1 | 7/2010 | Lyon et al. | |
| 2012/0114313 A1 | 5/2012 | Phillips et al. | |

OTHER PUBLICATIONS

"Annual Report 2007," copyright 2007, Plantronics, Inc., Santa Cruz, California, 120 pages.

"Apple iPhone App Reviews—iFones.com," at <http://ifones.com/applie-sdk-native-orb-app-brings-live-tv-to-your-iphone-3/>, dated May 19, 2009, printed Jul. 31, 2009, 5 pages.

"Composite Capability / Preference Profiles," Wikipedia, found at <http://en.wikipedia.org/wiki/Composite_Capability/Preference_Profiles> from Internet Archive, dated Oct. 9, 2008, last modified Jan. 9, 2008, printed Nov. 1, 2011, 1 page.

Herman, Ivan, World Wide Web Consortium (W3C), "CC/PP," Aug. 22, 2005, slide show about Composite Capabilities / Preference Profiles, found at <http://www.w3.org/Consortium/Offices/Presentations/CCPP/#(1)>, printed Nov. 1, 2011, 14 pages.

"ICA Positioning Paper," Mar. 16, 1996, at <http://www.citrix.com/technology/icatech.htm>, found on Internet Archive dated Oct. 24, 1997, copyright 1996, Citrix Systems, printed Sep. 4, 2009, 6 pages.

"ICA Technical Paper," Mar. 16, 1996, at <http://www.citrix.com/technology/icatech.htm>, found on the Internet Archive, copyright 1997, Citrix Systems, Inc., printed Jul. 6, 2010, 8 pages.

"Monsoon Hava," Wikipedia, at <http://en.wikipedia.org/wiki/Monsoon_HAVA>, page last modified Jun. 4, 2009, printed Jun. 12, 2009, 4 pages.

Scherer, B. and Klaben, G., "Company Overview," Plantronics Presentation, Jan. 22, 2008, Plantronics, Inc., 38 pages.

"Wireless PC@TVtm—Enjoy the Internet, PC Games and more, all on your TV," Dec. 15, 1997, at <http://www.rfiinktech.com/pctv.htm>, found on the Internet Archive dated Dec. 6, 1998, printed Jun. 28, 2010, 4 pages.

"Word Spy—placeshift," at <http://www.wordspy.com/words/placeshift.asp>, posted Nov. 14, 2005, printed Jul. 31, 2009, 1 page.

Zahariadis, Theodore et al., "Scalable Content Delivery Over P2P Convergent Networks," IEEE International Symposium on Consumer Electronics, Apr. 14-16, 2008, Vilamoura, Portugal, 4 pages.

"Streamium—Philips Wireless Audio," at <http://www.streamium.philips.com/>, copyright 2004-2012, Koninklijke Philips Electronics N.V., printed Jul. 3, 2012, 1 page.

\* cited by examiner

SYSTEM AND METHOD FOR VIDEO DISPLAY TRANSFER BETWEEN VIDEO PLAYBACK DEVICES

RELATED APPLICATIONS

This application claims the benefit of provisional patent application Ser. No. 61/227,189, filed Jul. 21, 2009, the disclosure of which is hereby incorporated herein by reference in its entirety.

FIELD OF THE DISCLOSURE

The present disclosure relates to transferring display of video content from one device to another.

BACKGROUND

As mobile devices having media playback capabilities become more prevalent, new opportunities are emerging for how these mobile devices can enhance video watching experiences. For example, services such as Orb Live and Slingbox allow users to remotely view video content, such as live television, from their homes using their mobile devices. However, these services do little to improve the video watching experience while the users are at their own homes. One issue with watching video content using conventional technology found in today's homes is that there is no good way to move video content from one display or renderer in the home to another without any delay in playback or fumbling through menus to pause and shift playback. As such, there is a need for a system and method that improves the video watching experience by enabling a user to quickly and easily transfer display of video content between devices.

SUMMARY

Systems and methods are disclosed for transferring video display between video playback devices. In one embodiment, a mobile, or handheld, device receives user input that initiates transfer of display of video content to the mobile device from a desired renderer located proximate to the mobile device. The mobile device then causes transfer of display of the video content to the mobile device from the desired renderer. Display of the video content at the mobile device begins at a point in playback of the video content that is being displayed at the desired renderer at the time of the transfer. In one embodiment, the mobile device automatically, or programmatically, detects the desired rendering device from which display of the video content is to be transferred.

In another embodiment, a mobile, or handheld, device receives user input that initiates transfer of display of video content from the mobile device to a desired renderer located proximate to the mobile device. The mobile device then causes transfer of display of the video content from the mobile device to the desired renderer. Display of the video content at the desired renderer begins at a point in playback of the video content that is being displayed at the mobile device at the time of the transfer. In one embodiment, the mobile device automatically, or programmatically, detects the desired rendering device to which display of the video content is to be transferred.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
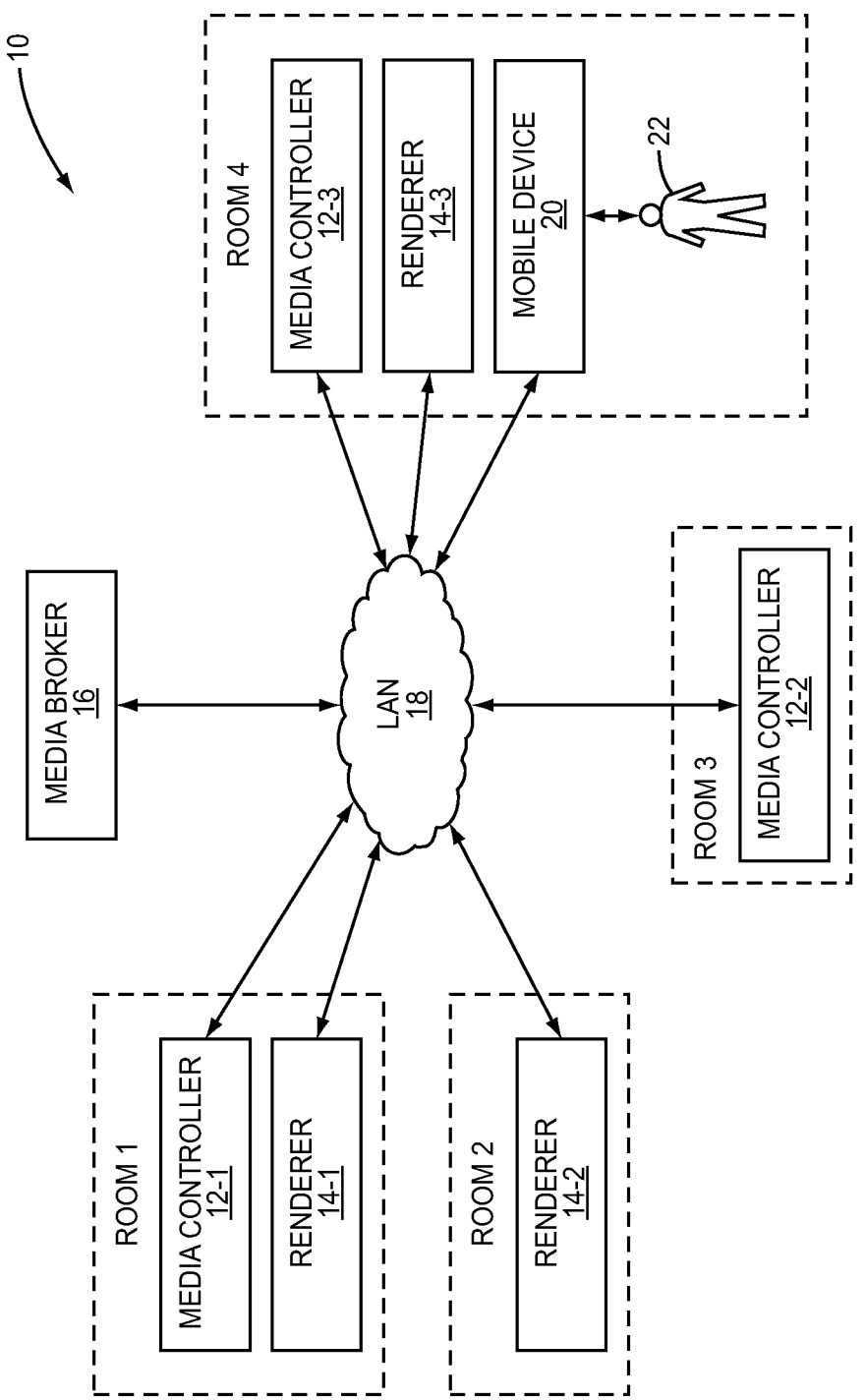
FIG. 1 illustrates a system for transferring display of video content between a mobile device and a renderer located proximate to the mobile device according to one embodiment of the present disclosure.

FIG. 1 illustrates a system 10 enabling transfer of video display from one device to another according to one embodiment of the present disclosure. As illustrated, the system 10 includes a number of media controllers 12-1 through 12-3 and renderers 14-1 through 14-3 and a media broker 16 connected via a Local Area Network (LAN) 18. The LAN 18 is preferably a wireless LAN such as, for example, a WiFi or IEEE 802.11x network, but is not limited thereto. The system 10 also includes a mobile, or handheld, device 20 having an associated user 22. Note that mobile device and handheld device are used interchangeably herein. In this embodiment, the system 10 is within a person's home, where the media controller 12-1 and the renderer 14-1 are located in a first room of the home, the renderer 14-2 is located in a second room of the home, the media controller 12-2 is located in a third room of the home, and the media controller 12-3 and the renderer 14-3 are located in a fourth room of the home. Note that the media controllers 12-1 through 12-3 are generally referred to herein as media controllers 12, and a single one of the media controllers 12-1 through 12-3 is generally referred to herein as a media controller 12. Similarly, the renderers 14-1 through 14-3 are generally referred to herein as renderers 14, and a single one of the renderers 14-1 through 14-3 is referred to herein as a renderer 14.

The media controllers 12 are generally devices that operate as sources of video content within the system 10. Note, however, that the video content sourced by the media controllers 12 within the system 10 may be stored locally at the media controllers 12 or may be obtained from remote sources such as, for example, Internet-based streaming video services (e.g., Hulu, Netflix, CBS.com, or the like) or terrestrial or satellite based television networks. The video content sourced by the media controllers 12 may be, for example, movies, television programs, video clips, home movies, or the like. In one specific embodiment, the media controllers 12 are devices that operate as Digital Living Network Alliance (DLNA) digital media servers. However, the present disclosure is not limited thereto. Exemplary types of media controllers 12 are set-top boxes that have access to live and/or on-demand television content from terrestrial or satellite television networks, personal computers that have access to stored video content and/or Internet-based streaming video content, Digital Video Recorders (DVRs) that have access to stored video content such as, for example, stored television content, Apple TV® devices, gaming consoles (e.g., PlayStation 3®) that have access to Internet based video content (e.g., Netflix streaming video service, Hulu, or CBS.com), network storage devices (e.g., Network Attached Storage (NAS) device), or the like.

The renderers 14 are generally devices that operate to provide playback or rendering from the media controllers 12. In one embodiment, video content may be streamed from any media controller 12 to any renderer 14 via the LAN 18. The video content may be streamed directly from the media controller 12 to the renderer 14 or streamed through the media broker 16. In one specific embodiment, the renderers 14 are devices that operate as DLNA digital media players or digital media renderers. However, the present disclosure is not limited thereto. Exemplary types of renderers 14 are televisions, gaming consoles, set-top boxes, personal computers, or the like. Note that while the media controllers 12 and the renderers 14 are illustrated separately for clarity and ease of discussion, it should be appreciated that a single device may operate as both a media controller 12 and a renderer 14. For example, a personal computer may operates both as a media controller 12 that operates as a source of video content for the renderers 14 and as a renderer 14 that provides playback or rendering of video content from other media controllers 12.

The media broker 16 is preferably implemented in software and is hosted either by a separate device in the system 10 or one of the existing devices in the system 10. For example, the media broker 16 may be hosted by a separate computer within the system 10. Alternatively, one of the media controllers 12 may be a personal computer, and the media broker 16 may be hosted by that personal computer. As discussed below, in one embodiment, the media broker 16 operates to maintain a merged guide that includes a listing of all of the media content accessible to the media controllers 12 and therefore available for playback or rendering at the renderers 14. In addition, the media broker 16 operates to manage transfer of display of video content from the mobile device 20 to one of the renderers 14 and/or transfer of display of video content to the mobile device 20 from one of the renderers 14.

Figure 2:
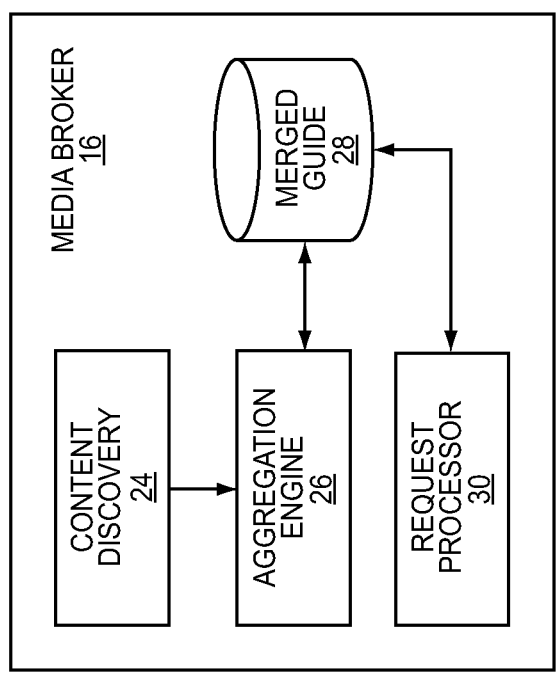
FIG. 2 is a functional block diagram of the media broker of FIG. 1 according to one embodiment of the present disclosure.

FIG. 2 is a functional block diagram of the media broker 16 according to one embodiment of the present disclosure. As illustrated, the media broker 16 includes a content discovery function 24, an aggregation engine 26, a merged guide 28, and a request processor 30. The content discovery function 24 discovers video content accessible to the media controllers 12. While any suitable discovery technique may be used, in one embodiment, the content discovery function 24 queries the media controllers 12 for lists of content accessible to the media controllers 12. These lists may be referred to herein as local guides of the media controllers 12. Updates may be obtained from the media controllers 12 as needed (e.g., periodically). In another embodiment, the media controllers 12 proactively send their local guides and corresponding updates to the content discovery function 24.

The aggregation engine 26 operates to aggregate, or merge, the local guides of the media controllers 12 to form the merged guide 28. The merged guide 28 may be implemented as, for example, a list of video content items and, for each video content item, a list of media controllers 12 from which the video content item is accessible. In addition, for time restricted video content items such as television content, the merged guide 28 may include timing information that identifies times at which those video content items are accessible to the media controllers 12 (e.g., times at which the video content will be broadcast). The request processor 30 generally operates to serve merged guide and video content requests from the renderers 14 and server display transfer requests from the mobile device 20, as described below in detail.

Figure 3:
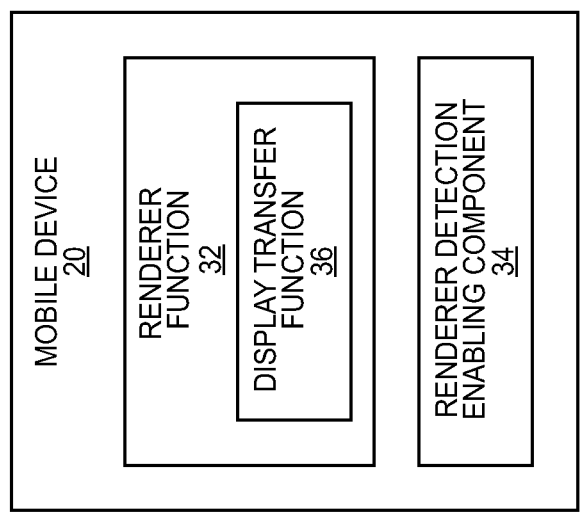
FIG. 3 is a functional block diagram of the mobile device of FIG. 1 according to one embodiment of the present disclosure.

FIG. 3 is a functional block diagram of the mobile device 20 of FIG. 1 according to one embodiment of the present disclosure. As illustrated, the mobile device 20 includes a renderer function 32 and a renderer detection enabling component 34. The renderer function 32 may be implemented in software, hardware, or a combination thereof. In this embodiment, the renderer function 32 enables playback or rendering of video content from the media controllers 12 at the mobile device 20 and, optionally, video content from local storage of the mobile device 20 and/or a remote content source (e.g., an Internet based streaming video source). In addition, the renderer function 32 includes a display transfer function 36. As discussed below in detail, the display transfer function 36 enables transfer of display of video content to the mobile device 20 from one of the renderers 14 located proximate to the mobile device 20, which in FIG. 1 is the renderer 14-3. In addition, the display transfer function 36 enables transfer of display of video content from the mobile device 20 to one of the renderers 14 located proximate to the mobile device 20, which again in FIG. 1 is the renderer 14-3.

The renderer detection enabling component 34 may be implemented in software, hardware, or a combination thereof. In general, the renderer detection enabling component 34 enables detection of a desired renderer 14 that is proximate to the mobile device 20 and to which or from which display of video content is to be transferred. As discussed below in detail, the renderer detection enabling component 34 may include a digital camera, a Bluetooth® transceiver, a Global Positioning System (GPS) receiver, a digital compass, or the like. Using data obtained from the renderer detection enabling component 34 either the display transfer function 36 or the media broker 16 is enabled to identify the desired renderer 14 that is proximate to the mobile device 20 to which or from which display of video content is to be transferred.

Figure 4:
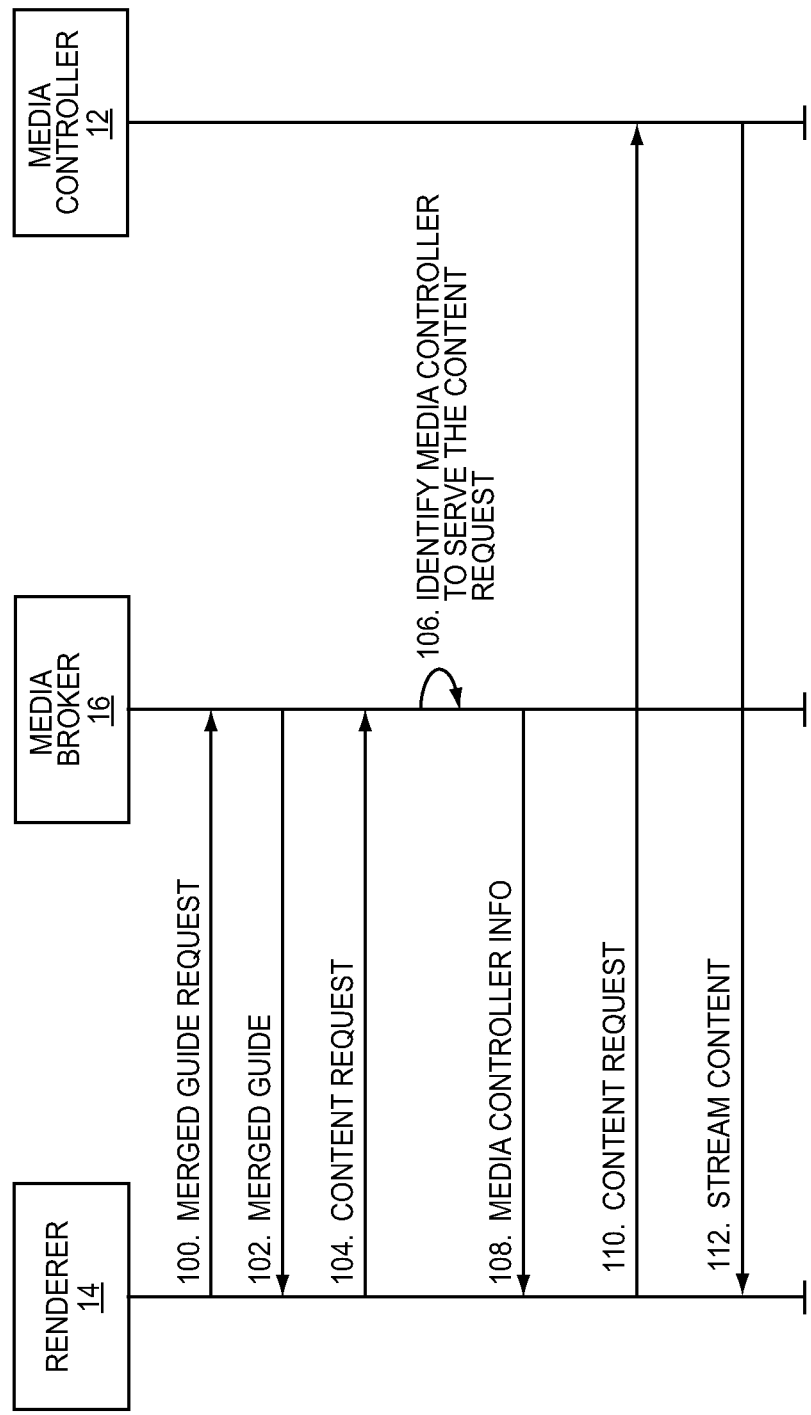
FIG. 4 illustrates the operation of the system of FIG. 1 to enable display or playback of video content on one of the renderers from one of the media controllers according to one embodiment of the present disclosure.

FIG. 4 illustrates the operation of the media broker 16 to serve merged guide and video content requests according to one embodiment of the present disclosure. First, one of the renderers 14 sends a merged guide request to the media broker 16 via the LAN 18 (step 100). In response, the media broker 16 returns the merged guide 28, or some relevant portion thereof, to the renderer 14 (step 102). For example, the media broker 16 may obtain a merged list of video content items currently accessible to the media controllers 12 from the merged guide 28 and return this merged list of video content items to the renderer 14 rather than the entire merged guide 28. While not illustrated, the renderer 14 displays the merged guide 28 to an associated user, and the associated user is enabled to select a desired video content item for rendering at the renderer 14. In response to receiving the selection from the associated user, the renderer 14 sends a content request for the desired video content item to the media broker 16 (step 104).

The media broker 16 then identifies one of the media controllers 12 that can serve the content request (step 106). Specifically, the media controller 12 identified to serve the content request is one of the media controllers 12 enabled to source the desired video content item at the time of the content request. The media broker 16 then returns a response to the renderer 14 that includes media controller information for the media controller 12 identified for serving the content request (step 108). The media controller information includes information that enables the renderer 14 to request the desired video content item from the media controller 12 such as, for example, an Internet Protocol (IP) address of the media controller 12 and any credentials needed to access the media controller 12 (e.g., a password). Next, the renderer 14 sends a content request for the desired video content item to the media controller 12 via the LAN 18 (step 110). In response, the media controller 12 streams the desired video content item to the renderer 14 (step 112).

In an alternative embodiment, the merged guide 28, or portion thereof, returned to the renderer 14 in step 102 may include information identifying the media controllers 12 from which the video content items are accessible. Then, once the desired video content item is selected at the renderer 14, the renderer 14 may use the information in the merged guide 28 to identify the media controller 12 from which the desired video content item is accessible and then send a request for the desired video content item to that media controller 12. In this manner, the renderer 14 is not required to contact the media broker 16 to determine which media controller 12 is able to source the desired video content item.

Figure 5:
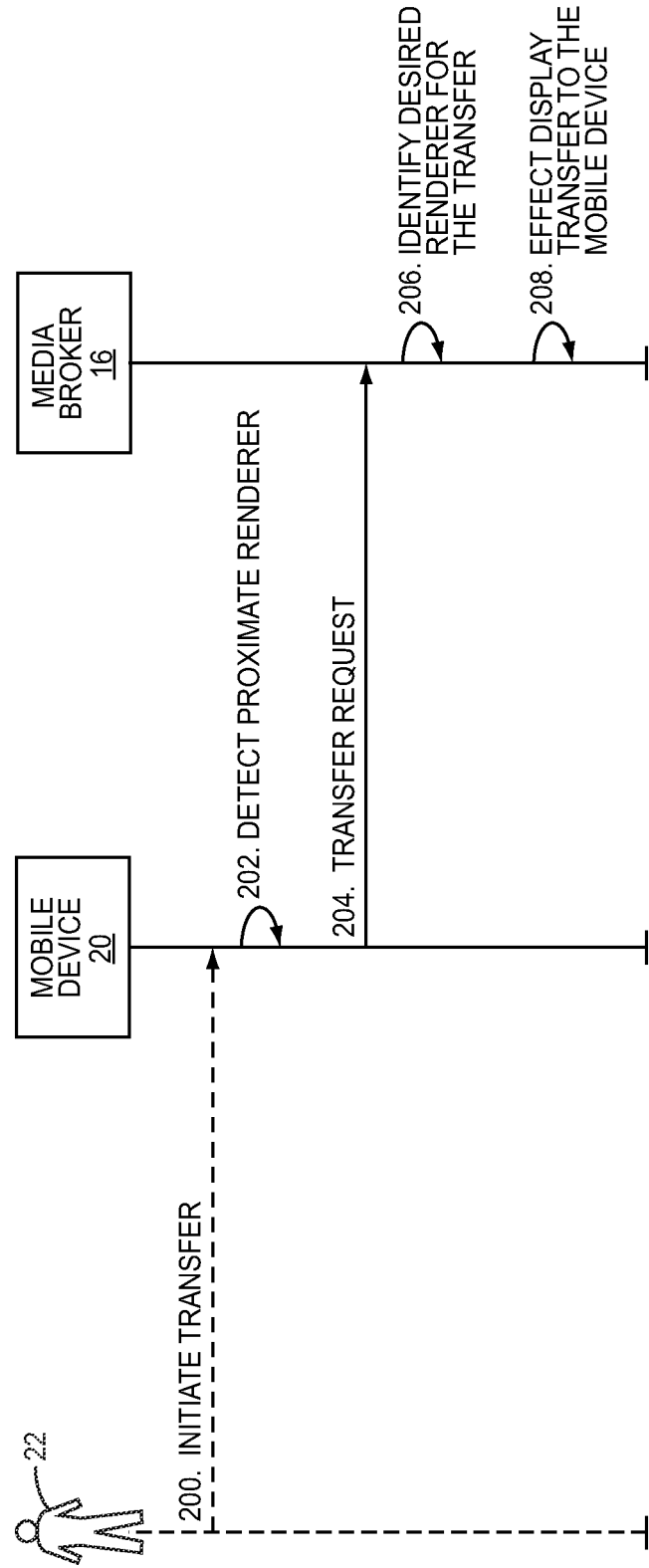
FIG. 5 illustrates the operation of the system of FIG. 1 to transfer display of video content from a desired renderer to the mobile device according to one embodiment of the present disclosure.

FIG. 5 is a general illustration of the operation of the system 10 of FIG. 1 to provide transfer of display of video content from one of the renderers 14 to the mobile device 20 according to one embodiment of the present disclosure. As illustrated, the user 22 of the mobile device 20 first initiates transfer of display of video content from one of the renderers 14 to the mobile device 20 (step 200). For example, the display transfer function 36 of the mobile device 20 may present a button or similar mechanism to the user 22 via a graphical user interface displayed at the mobile device 20. The user 22 may then initiate the display transfer process by selecting the button and, in some embodiments, pointing the mobile device 20 toward the renderer 14 from which display is to be transferred.

Next, the display transfer function 36 of the mobile device 20 detects the renderer 14 located proximate to the mobile device 20 from which display of video content is to be transferred (step 202). This renderer 14 is also referred to herein as the desired renderer 14. The detection of the desired renderer 14 is preferably automatic in that detection does not require selection of the desired renderer 14 by the user 22 from a list of renderers 14. However, the present disclosure is not limited thereto. In one embodiment, the renderer detection enabling component 34 of the mobile device 20 includes a digital camera, and the digital camera is used to capture a digital image of the desired renderer 14. The desired renderer 14 may then be identified using fiduciary markers in the digital image. As discussed below, this identification process is preferably performed by the media broker 16, but is not limited thereto. As will be understood by one of ordinary skill in the art, a fiduciary marker is any visual characteristic of the desired renderer 14 that may be used to identify the desired renderer 14 such as, for example, a logo or brand name appearing on the renderer 14, the dimensions of the renderer 14, a bar code placed on the renderer 14, or the like. Other types of fiduciary markers may be used and are within the scope of the present disclosure.

In another embodiment, the renderer detection enabling component 34 of the mobile device 20 includes a Bluetooth® transceiver. In this embodiment, the desired renderer 14 is also equipped with a Bluetooth® transceiver. A Bluetooth® discovery process may then be utilized to obtain an identifier (e.g., a Bluetooth® ID) of the desired renderer 14. As discussed below, this identifier may then be used by the media broker 16 to identify the desired renderer 14. If multiple renderers 14 are within the range of the Bluetooth® transceiver, Received Signal Strength Indication (RSSI) or a similar technique may be used by the display transfer function 36 to select the renderer 14 that is closest to the mobile device 20 as the desired renderer 14. The Bluetooth® ID of the desired renderer 14 may then be sent to the media broker 16 to be used to identify which renderer 14 in the system 10 is the desired renderer 14 for the display transfer, as discussed below. Alternatively, the desired renderer 14 may not necessarily be the closest renderer 14 to the mobile device 20. In this case, the renderer detection enabling component 34 of the mobile device 20 may also include a digital camera. The user 22 may point the digital camera at the desired renderer 14 when initiating the transfer of display of video content, and the digital camera may be used as a digital range finder to determine an approximate distance between the mobile device 20 and the desired renderer 14. The approximate distance may then be used in combination with the RSSI values for each renderer 14 within the range of the Bluetooth® transceiver of the mobile device 20 to select the desired renderer 14. The Bluetooth® ID of the desired renderer 14 may then be sent to the media broker 16 to be used to identify which renderer 14 in the system 10 is the desired renderer 14 for the display transfer, as discussed below.

In yet another embodiment, the renderer detection enabling component 34 of the mobile device 20 includes a GPS receiver and a digital compass. The locations of the renderers 14 are known via, for example, GPS receivers associated with the renderers 14, manual entry by associated user(s), or the like. When initiating the transfer, the user 22 may point the mobile device 20 at the desired renderer 14. The location of the mobile device 20 and the direction that the mobile device 20 is pointing may then be used to identify the desired renderer 14.

Next, the display transfer function 36 of the mobile device 20 sends a transfer request to the media broker 16 (step 204) and, in response, the media broker 16 identifies the desired renderer 14 for the transfer request (step 206). In one embodiment, the transfer request includes a digital image of the desired renderer 14 that was captured by the mobile device 20 in step 202. The media broker 16 may then use the digital image to determine which of the renderers 14 in the system 10 is the desired renderer 14. For instance, fiduciary markers may be identified within the digital image and compared to known fiduciary markers of the renderers 14 in the system 10 in order to determine a match. The renderer 14 having fiduciary markers that match those extracted from the digital image is then identified as the desired renderer 14.

In another embodiment, the transfer request includes a Bluetooth® ID of the desired renderer 14. As discussed above, using one of the techniques described above, the Bluetooth® ID of the desired renderer 14 may be obtained by the display transfer function 36 and provided to the media broker 16 in the transfer request. The media broker 16 may maintain a record of the Bluetooth® IDs of the renderers 14 in the system 10. Using this record and the Bluetooth® ID of the desired renderer 14 included in the transfer request, the media broker 16 is enabled to identify which of the renderers 14 in the system 10 is the desired renderer 14.

Once the desired renderer 14 has been identified, the media broker 16 effects transfer of display of the video content currently being displayed at the desired renderer 14 to the mobile device 20 (step 208). In one embodiment, once transfer is complete, display of the video content at the desired renderer 14 is terminated. In another embodiment, display of the video content at the desired renderer 14 continues such that the video content is displayed at both the mobile device 20 and the desired renderer 14. In this case, the video content may be provided to the mobile device 20 and the desired renderer 14 via separate streams such that the mobile device 20 and the desired renderer 14 can independently control display of the video content (e.g., pausing, rewinding, fast-forwarding, etc.).

Figure 6:
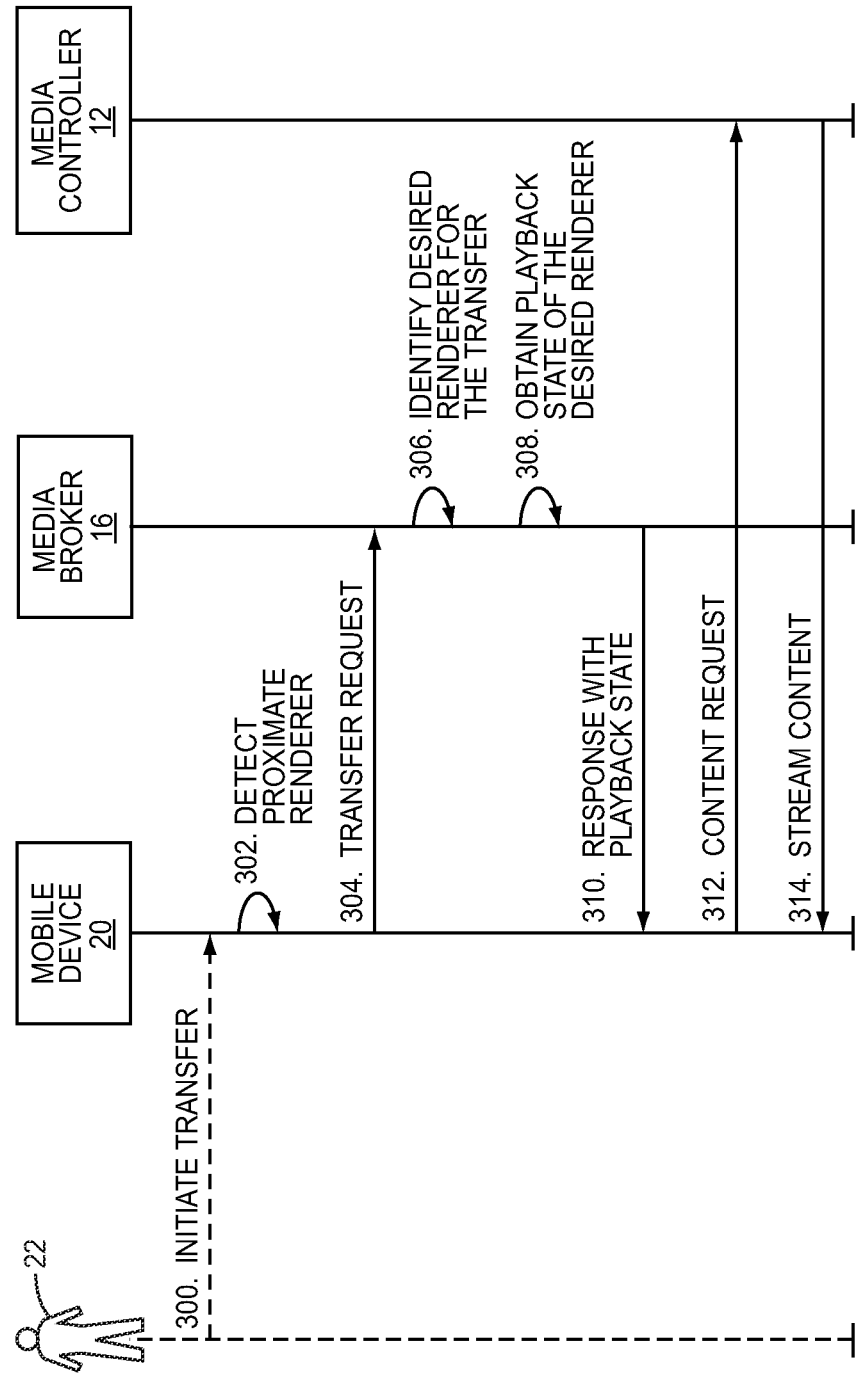
FIG. 6 illustrates the operation of the system of FIG. 1 to transfer display of video content from a desired renderer to the mobile device in more detail according to one embodiment of the present disclosure.

The manner in which display of the video content is transferred from the desired renderer 14 to the mobile device 20 may vary depending on the particular implementation. One of ordinary skill in the art will readily appreciate numerous ways in which this transfer can be performed upon reading this disclosure. However, for completeness, FIG. 6 illustrates an exemplary embodiment for transferring display of the video content from the desired renderer 14 to the mobile device 20. As illustrated, the transfer process begins as described above with respect to FIG. 5. First, the user 22 of the mobile device 20 initiates the transfer (step 300). In response, the display transfer function 36 of the mobile device 20 detects the desired renderer 14 that is located proximate to the mobile device 20 and from which display of video content is to be transferred to the mobile device 20 (step 302). The display transfer function 36 of the mobile device 20 then sends a transfer request to the media broker 16 (step 304). In response, the media broker 16 identifies one of the renderers 14 as the desired renderer 14 for the transfer (step 306).

In this embodiment, in order to effect transfer of display of the video content from the desired renderer 14 to the mobile device 20, the media broker 16 obtains a playback state of the desired renderer 14 (step 308) and sends a response including the playback state of the desired renderer 14 to the mobile device 20 (step 310). Using the playback state, the display transfer function 36 then sends a content request to a media controller 12 for the video content item starting at a point in playback that corresponds to the point in playback at the desired renderer 14 at the time of the transfer (step 312). The media controller 12 to which the content request is sent may or may not be the same media controller 12 providing the video content item to the desired renderer 14, depending on the particular implementation. The media controller 12 then begins streaming the video content item to the mobile device 20 for playback or rendering by the renderer function 32 of the mobile device 20 starting at the point in playback of the video content item being displayed at the desired renderer 14 at the time of the transfer (step 314). In this manner, display of the video content item is seamlessly transferred from the desired renderer 14 to the mobile device 20.

More specifically, in one embodiment, the playback state of the desired renderer 14 obtained in step 308 includes information identifying the media controller 12 currently providing the video content to the desired renderer 14 for playback or rendering and information identifying either the desired renderer 14 or the content stream being delivered from the media controller 12 to the desired renderer 14. The display transfer function 36 of the mobile device 20 may then send the content request to the media controller 12 that is delivering the video content item to the desired renderer 14, where the content request includes either information identifying the desired renderer 14 or the stream being delivered to the desired renderer 14. In response, the media controller 12 determines what video content item is being streamed to the desired renderer 14 and begins streaming that video content item to the mobile device 20. The streaming of the video content item to the mobile device 20 begins at a point in the video content item currently being displayed at the desired renderer 14.

In another embodiment, the playback state of the desired renderer 14 obtained in step 308 includes information identifying the video content item and the point in playback of the video content item being displayed at the desired renderer 14 at the time of the transfer. In this embodiment, the response sent to the mobile device 20 in step 310 includes both the playback state of the desired renderer 14 as well as information identifying a media controller 12 from which the mobile device 20 can obtain the video content item being displayed on the desired renderer 14. This media controller 12 may or may not be the same media controller 12 as that delivering the video content item to the desired renderer 14. The display transfer function 36 of the mobile device 20 then sends a request to the media controller 12 identified in the response received in step 310 for the identified video content item starting at the identified position in playback of the video content item. In response, the media controller 12 begins streaming the video content item to the mobile device 20 starting at the identified position in playback.

Before proceeding, a few variations to the process of FIG. 6 should be noted. In a first alternative embodiment, after obtaining the playback state of the desired renderer 14 in step 308, the media broker 16 may instruct the media controller 12 to begin streaming the video content item to the mobile device 20. In this manner, the playback state does not need to be communicated back to the mobile device 20 nor does the mobile device 20 need to request the video content item from the media controller 12. In a second alternative embodiment, the streaming of the video content item may be through the media broker 16. More specifically, after step 308, the media broker 16 may request the video content item from the media controller 12 and then stream the video content item to the mobile device 20.

It should also be noted that is some implementations, the video content item for which display transfer is requested may already be stored on the mobile device 20 or may otherwise be accessible to the mobile device 20. In this case, the playback state received by the mobile device 20 in step 310 may include information identifying the video content item and the playback position for the display transfer. The display transfer function 36 may then cause the renderer function 32 to begin playback or rendering of the video content item from the local or remote source starting at the identified playback position.

Figure 7:
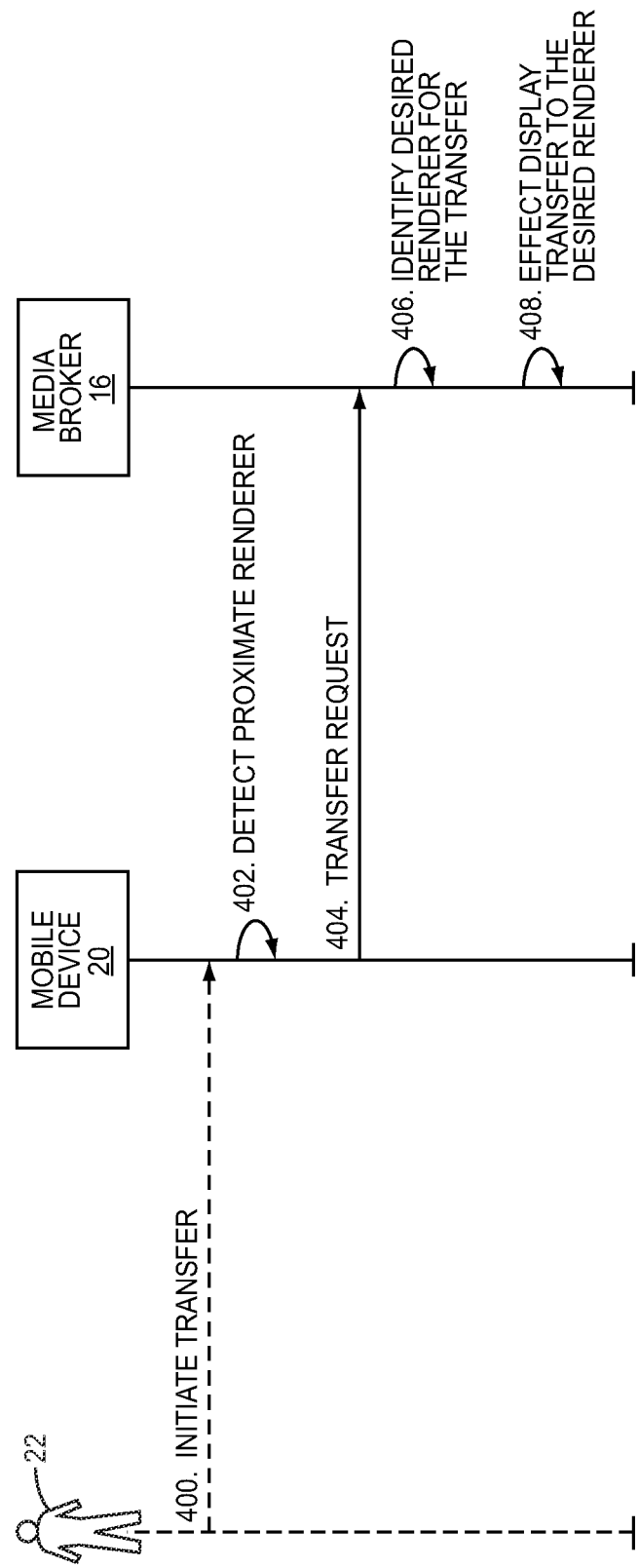
FIG. 7 illustrates the operation of the system of FIG. 1 to transfer display of video content from the mobile device to a desired renderer according to one embodiment of the present disclosure.

FIG. 7 is a general illustration of the operation of the system 10 of FIG. 1 to provide transfer of display of video content from the mobile device 20 to one of the renderers 14 according to another embodiment of the present disclosure. As illustrated, the user 22 of the mobile device 20 first initiates transfer of display of video content from the mobile device 20 to one of the renderers 14 (step 400). For example, the display transfer function 36 of the mobile device 20 may present a button or similar mechanism to the user 22 via a graphical user interface displayed at the mobile device 20. The user 22 may then initiate the display transfer process by selecting the button and, in some embodiments, pointing the mobile device 20 toward the renderer 14 to which display is to be transferred.

Next, the display transfer function 36 of the mobile device 20 detects the renderer 14 located proximate to the mobile device 20 to which display of video content is to be transferred (step 402). This renderer 14 is also referred to herein as the desired renderer 14. The detection of the desired renderer 14 is preferably automatic in that detection does not require selection of the renderer 14 by the user 22 from a list of renderers 14. However, the present disclosure is not limited thereto. In a manner similar to that described above, in one embodiment, the renderer detection enabling component 34 of the mobile device 20 includes a digital camera, and the digital camera is used to capture a digital image of the desired renderer 14. The desired renderer 14 may then be identified using fiduciary markers in the digital image. As discussed below, this identification process is preferably performed by the media broker 16, but is not limited thereto. Again, as will be understood by one of ordinary skill in the art, a fiduciary marker is any visual characteristic of the desired renderer 14 that may be used to identify the desired renderer 14 such as, for example, a logo or brand name appearing on the renderer 14, the dimensions of the renderer 14, a bar code placed on the renderer 14, or the like. Other types of fiduciary markers may be used and are within the scope of the present disclosure.

In another embodiment, the renderer detection enabling component 34 of the mobile device 20 includes a Bluetooth® transceiver. In this embodiment, the desired renderer 14 is also equipped with a Bluetooth® transceiver. A Bluetooth® discovery process may then be utilized to obtain an identifier (e.g., a Bluetooth® ID) of the desired renderer 14. As discussed below, this identifier may then be used by the media broker 16 to identify the desired renderer 14. If multiple renderers 14 are within the range of the Bluetooth® transceiver, RSSI or a similar technique may be used by the display transfer function 36 to select the desired renderer 14 that is closest to the mobile device 20. The Bluetooth® ID of the desired renderer 14 may then be sent to the media broker 16 to be used to identify which renderer 14 in the system 10 is the desired renderer 14 for the display transfer, as discussed below. Alternatively, the desired renderer 14 may not necessarily be the closest renderer 14 to the mobile device 20. In this case, the renderer detection enabling component 34 of the mobile device 20 may also include a digital camera. The user 22 may point the digital camera at the desired renderer 14 when initiating the transfer of display of video content, and the digital camera may be used as a digital range finder to determine an approximate distance between the mobile device 20 and the desired renderer 14. The approximate distance may then be used in combination with the RSSI values for each renderer 14 within the range of the Bluetooth® transceiver of the mobile device 20 to select the desired renderer 14. The Bluetooth® ID of the desired renderer 14 may then be sent to the media broker 16 to be used to identify which renderer 14 in the system 10 is the desired renderer 14 for the display transfer, as discussed below.

In yet another embodiment, the renderer detection enabling component 34 of the mobile device 20 includes a GPS receiver and a digital compass. The locations of the renderers 14 are known via, for example, GPS receivers associated with the renderers 14, manual entry by associated user(s), or the like. When initiating the transfer, the user 22 may point the mobile device 20 at the desired renderer 14. The location of the mobile device 20 and the direction that the mobile device 20 is pointing may then be used to identify the desired renderer 14.

Next, the display transfer function 36 of the mobile device 20 sends a transfer request to the media broker 16 (step 404) and, in response, the media broker 16 identifies the desired renderer 14 for the transfer request (step 406). In one embodiment, the transfer request includes a digital image of the desired renderer 14 that was captured by the mobile device 20 in step 402. The media broker 16 may then use the digital image to determine which of the renderers 14 in the system 10 is the desired renderer 14. For instance, fiduciary markers may be identified within the digital image and compared to known fiduciary markers of the renderers 14 in the system 10 in order to determine a match. The renderer 14 having fiduciary markers that match those extracted from the digital image is then identified as the desired renderer 14.

In another embodiment, the transfer request includes a Bluetooth® ID of the desired renderer 14. As discussed above, using one of the techniques described above, the Bluetooth® ID of the desired renderer 14 may be obtained by the display transfer function 36 and provided to the media broker 16 in the transfer request. The media broker 16 may maintain a record of the Bluetooth® IDs of the renderers 14 in the system 10. Using this record and the Bluetooth® ID of the desired renderer 14 included in the transfer request, the media broker 16 is enabled to identify which of the renderers 14 in the system 10 is the desired renderer 14.

Once the desired renderer 14 has been identified, the media broker 16 effects transfer of display of the video content currently being displayed at the mobile device 20 to the desired renderer 14 (step 408). In one embodiment, once transfer is complete, display of the video content at the mobile device 20 is terminated. In another embodiment, display of the video content at the mobile device 20 continues such that the video content is displayed at both the mobile device 20 and the desired renderer 14. In this case, the video content may be provided to the mobile device 20 and the desired renderer 14 via separate streams such that the mobile device 20 and the desired renderer 14 can independently control display of the video content (e.g., pausing, rewinding, fast-forwarding, etc.).

Figure 8:
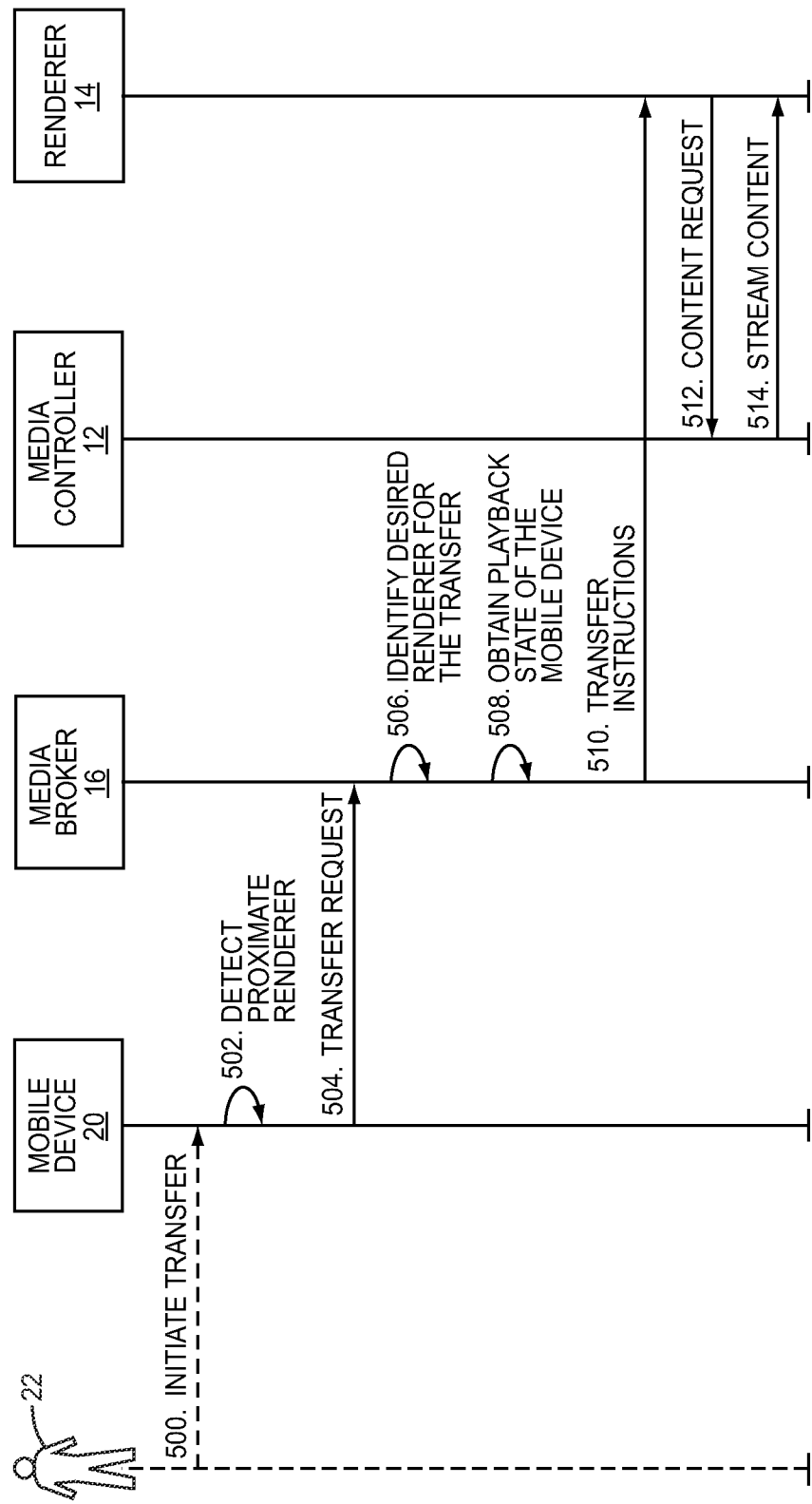
FIG. 8 illustrates the operation of the system of FIG. 1 to transfer display of video content from the mobile device to a desired renderer in more detail according to one embodiment of the present disclosure.

The manner in which display of the video content is transferred from the mobile device 20 to the desired renderer 14 may vary depending on the particular implementation. One of ordinary skill in the art will readily appreciate numerous ways in which this transfer can be performed upon reading this disclosure. However, for completeness, FIG. 8 illustrates an exemplary embodiment for transferring display of the video content from the mobile device 20 to the desired renderer 14. As illustrated, the transfer process begins as described above with respect to FIG. 7. First, the user 22 of the mobile device 20 initiates the transfer (step 500). In response, the display transfer function 36 of the mobile device 20 detects the desired renderer 14 that is located proximate to the mobile device 20 and to which display of video content is to be transferred (step 502). The display transfer function 36 of the mobile device 20 then sends a transfer request to the media broker 16 (step 504). In response, the media broker 16 identifies one of the renderers 14 as the desired renderer 14 for the transfer (step 506).

In this embodiment, in order to effect transfer of display of the video content to the desired renderer 14, the media broker 16 obtains a playback state of the mobile device 20 (step 508) and sends transfer instructions including the playback state of the mobile device 20 to the desired renderer 14 (step 510). Using the playback state, the desired renderer 14 then sends a content request to a media controller 12 for the video content item being rendered at the mobile device 20 starting at a point in playback that corresponds to the point in playback at the mobile device 20 at the time of the transfer (step 512). The media controller 12 to which the content request is sent may or may not be the same media controller 12, if any, providing the video content item to the mobile device 20, depending on the particular implementation. The media controller 12 then begins streaming the video content item to the desired renderer 14 starting at the point in playback of the video content item being displayed at the mobile device 20 at the time of the transfer (step 514). In this manner, transfer of display of the video content item from the desired renderer 14 to the mobile device 20 is seamless.

More specifically, in one embodiment, the playback state of the mobile device 20 obtained in step 508 includes information identifying the media controller 12 currently providing the video content to the mobile device 20 for playback or rendering and information identifying either the mobile device 20 or the content stream being delivered from the media controller 12 to the mobile device 20. The desired renderer 14 may then send the content request to the media controller 12 that is delivering the video content item to the mobile device 20, where the content request includes either information identifying the mobile device 20 or the stream being delivered to the mobile device 20. In response, the media controller 12 determines what video content item is being streamed to the mobile device 20 or being streamed in the identified stream and begins streaming that video content item to the desired renderer 14. The streaming of the video content item to the desired renderer 14 begins at a point in the video content item currently being displayed at the mobile device 20.

In another embodiment, the playback state of the mobile device 20 obtained in step 508 includes information identifying the video content item and the point in playback of the video content item being displayed at the mobile device 20 at the time of the transfer. In this embodiment, the transfer instructions sent to the desired renderer 14 in step 510 includes both the playback state of the mobile device 20 as well as information identifying a media controller 12 from which the desired renderer 14 can obtain the video content item being displayed on the mobile device 20. This media controller 12 may or may not be the same media controller 12 as that delivering the video content item to the mobile device 20, if any. The desired renderer 14 then sends a content request to the media controller 12 identified in the response received in step 510 for the identified video content item starting at the identified position in playback of the video content item. In response, the media controller 12 begins streaming the video content item to the desired renderer 14 starting at the identified position in playback.

It should be noted that, in one embodiment, acceptance of the display transfer from one or more users at the desired renderer 14 may be required before completing the transfer of display of the video content from the mobile device 20 to the desired renderer 14. For example, upon receiving the transfer instructions in step 510, the desired renderer 14 may present a message to any users currently at the desired renderer 14 asking whether to accept the display transfer. If the users deny the display transfer, then the process ends. If the users accept the display transfer or in some cases if there is no response, then the process proceeds as described above.

Before proceeding, a few variations to the process of FIG. 8 should be noted. In a first alternative embodiment, after obtaining the playback state of the mobile device 20 in step 508, the media broker 16 may instruct the media controller 12 to begin streaming the video content item to the desired renderer 14. In this manner, the playback state does not need to be communicated to the desired renderer 14 nor does the desired renderer 14 need to request the video content from the media controller 12. In a second alternative embodiment, the streaming of the video content item may be through the media broker 16. More specifically, after step 508, the media broker 16 may request the video content item from the media controller 12 and then stream the video content item to the desired renderer 14.

Figure 9:
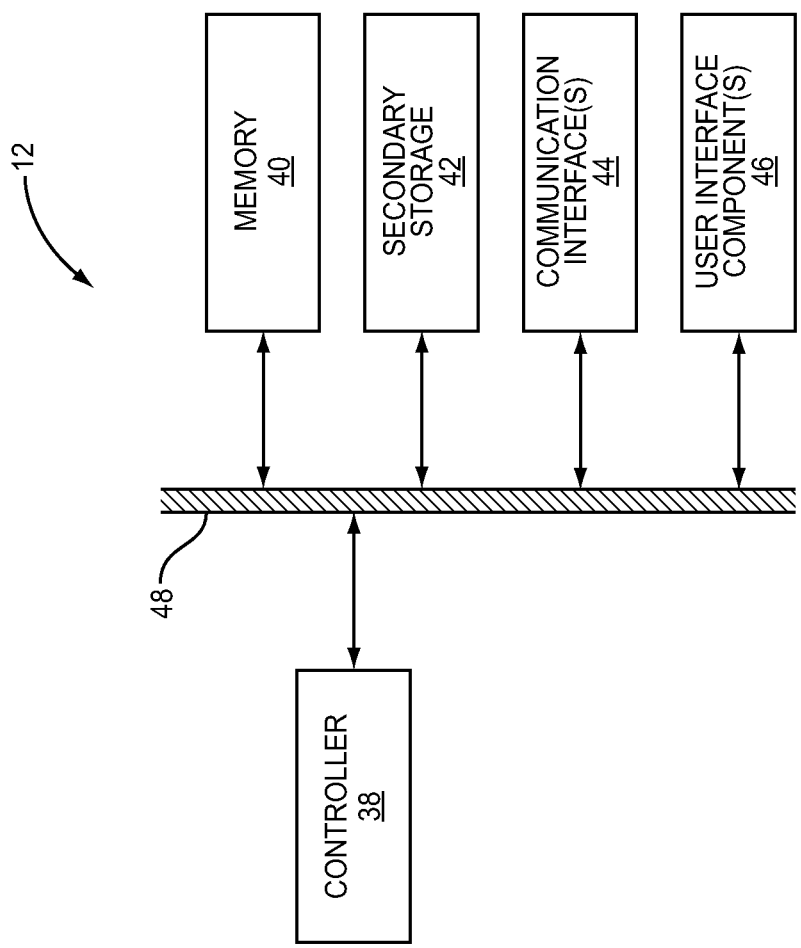
FIG. 9 is a block diagram of one of the media controllers of FIG. 1 according to one embodiment of the present disclosure.

FIG. 9 is a block diagram of one of the media controllers 12 according to one embodiment of the present disclosure. As illustrated, in this embodiment, the media controller 12 includes a controller 38 connected to memory 40, one or more secondary storage devices 42, one or more communication interfaces 44, and one or more user interface components 46 by a bus 48 or similar mechanism. The controller 38 is a microprocessor, digital Application Specific Integrated Circuit (ASIC), Field Programmable Gate Array (FPGA), or the like. In this embodiment, the controller 38 is a microprocessor, and software is stored in the memory 40 for execution by the controller 38. The software instructs the controller 38 to perform the functions of the media controller 12 described above. The secondary storage devices 42 are digital data storage devices such as, for example, one or more hard disk drives. The one or more communication interfaces 44 include a network interface to the LAN 18 (FIG. 1). This same network interface may be used to connect the media controller 12 to the Internet such that the media controller 12 is enabled to obtain video content from Internet based video content. In addition, the one or more communication interfaces 44 may include, for example, a tuner for a terrestrial or satellite based television network that enables the media controller 12 to receive television content, an Infrared (IR) receiver for receiving input from an associated user via a remote controller, or the like. The user interface components 46 may include, for example, one or more buttons, a display, a keypad, or the like.

Figure 10:
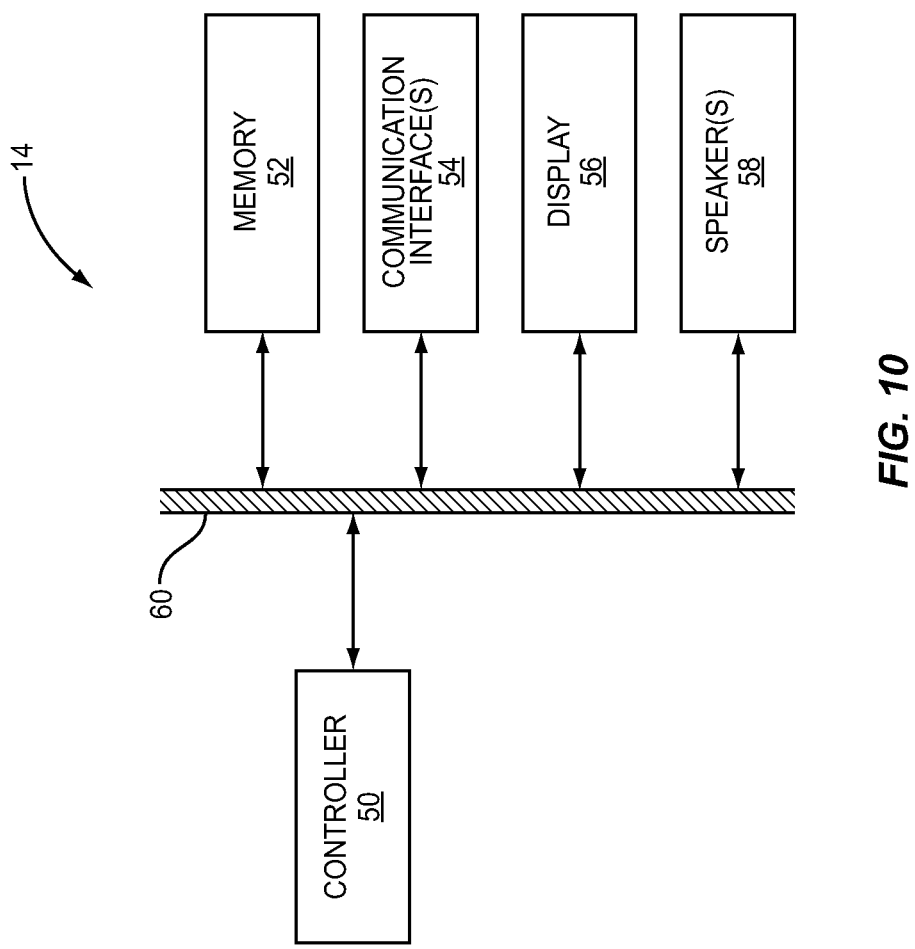
FIG. 10 is a block diagram of one of the renderers of FIG. 1 according to one embodiment of the present disclosure.

FIG. 10 is a block diagram of one of the renderers 14 according to one embodiment of the present disclosure. As illustrated, in this embodiment, the renderer 14 includes a controller 50 connected to memory 52, one or more communication interfaces 54, a display 56, and one or more speakers 58 by a bus 60 or similar mechanism. The controller 50 is a microprocessor, digital ASIC, FPGA, or the like. In this embodiment, the controller 50 is a microprocessor, and software is stored in the memory 52 for execution by the controller 50. The software instructs the controller 50 to perform the functions of the renderer 14 described above. The one or more communication interfaces 54 include a network interface to the LAN 18 (FIG. 1). In addition, the one or more communication interfaces 54 may include, for example, a Bluetooth® interface, a wired interface to one of the media controllers 12 (e.g., a High Definition Multimedia Interface (HDMI) interface), an IR receiver for receiving user input via a remote controller, or the like.

Figure 11:
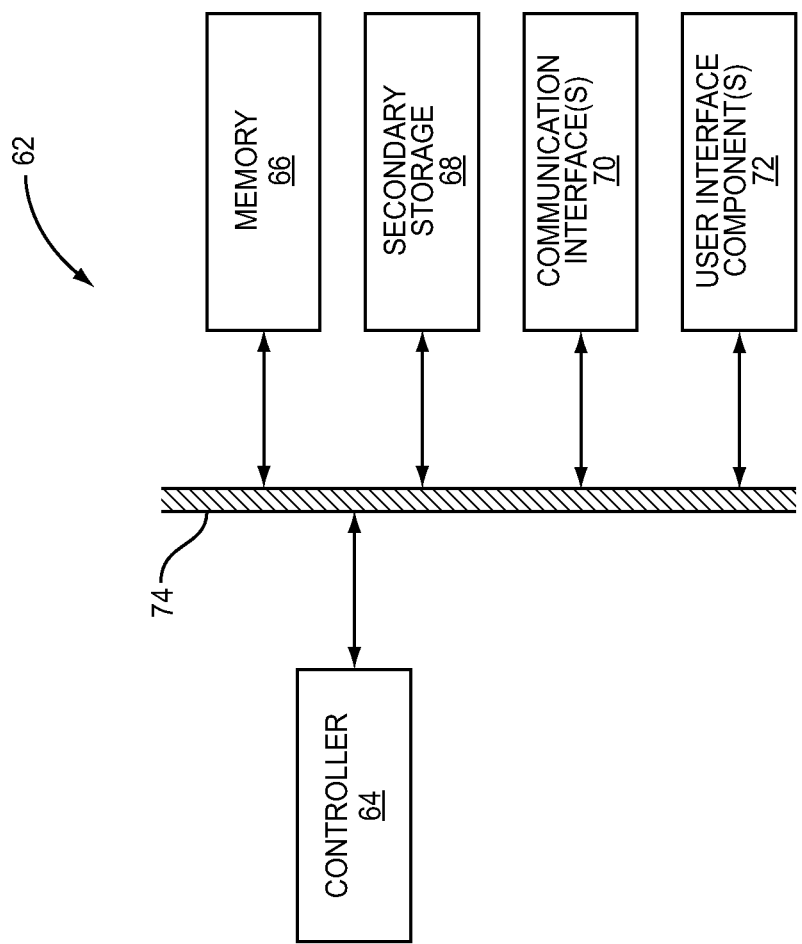
FIG. 11 is a block diagram of a device hosting the media broker of FIG. 1 according to one embodiment of the present disclosure.

FIG. 11 is a block diagram of a device 62 hosting the media broker 16 according to one embodiment of the present disclosure. As illustrated, the device 62 includes a controller 64 connected to memory 66, one or more secondary storage devices 68, one or more communication interfaces 70, and one or more user interface components 72 by a bus 74 or similar mechanism. The controller 64 is a microprocessor, digital ASIC, an FPGA, or the like. In this embodiment, the controller 64 is a microprocessor, and the media broker 16 is implemented in software and stored in the memory 66 for execution by the controller 64. The secondary storage devices 68 are digital data storage devices such as, for example, one or more hard disk drives. The one or more communication interfaces 70 include a network interface to the LAN 18 (FIG. 1). The user interface components 72 may include, for example, one or more buttons, a display, a keypad, or the like.

Figure 12:
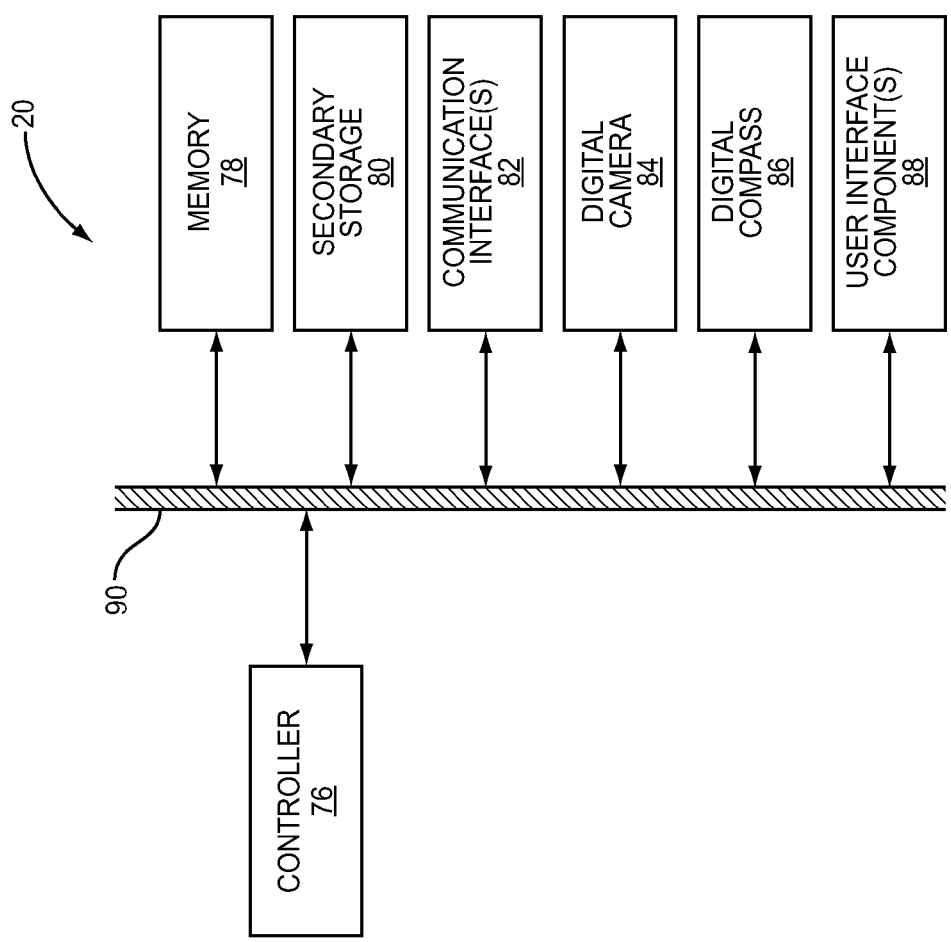
FIG. 12 is a block diagram of the mobile device of FIG. 1 according to one embodiment of the present disclosure.

FIG. 12 is a block diagram of the mobile device 20 of FIG. 1 according to one embodiment of the present disclosure. As illustrated, the mobile device 20 includes a controller 76 connected to memory 78, one or more secondary storage devices 80, one or more communication interfaces 82, a digital camera 84, a digital compass 86, and one or more user interface components 88 by a bus 90 or similar mechanism. The controller 76 is a microprocessor, digital ASIC, an FPGA, or the like. In this embodiment, the controller 76 is a microprocessor, and the renderer function 32 is implemented in software and stored in the memory 78 for execution by the controller 76. The secondary storage devices 80 are digital data storage devices such as, for example, one or more hard disk drives, flash memory, or the like. The one or more communication interfaces 82 include a network interface to the LAN 18 (FIG. 1). In addition, the one or more communication interfaces 82 may include a Bluetooth® interface, a cellular telecommunications interface, or the like. The user interface components 88 may include, for example, one or more buttons, a display, a speaker, a keypad, or the like.

The system 10 of FIG. 1 has substantial opportunity for variation without departing from the spirit or scope of the present disclosure. As a first variation, when transferring display of video content from a renderer 14 to the mobile device 20, the video content may alternatively be streamed from the renderer 14 to the mobile device 20 via a direct wireless communication link such as, for example, a Bluetooth® connection. As another variation, while the functionality of the media broker 16 has been described herein as being centralized, the present disclosure is not limited thereto. For instance, the functionality of the media broker 16 may alternatively be distributed across two or more of the media controllers 12.

As a third variation, the concepts described herein are also applicable to more conventional video content delivery systems. For example, a traditional set-top box for a terrestrial or satellite television network, which may or may not have DVR functionality, may be configured to enable transfer of display of video content from a connected display (e.g., a TV connected to the set-top box via a HDMI cable) to a proximate mobile device 20 or vice versa. Here, when transferring display to the mobile device 20, the set-top box may stream the video content to the mobile device 20 via a direct local wireless connection (e.g., a Bluetooth® connection) or a wireless LAN connection (e.g., an IEEE 802.11x connection) to provide a seamless transfer of display of the video content to the mobile device 20. Conversely, when transferring display from the mobile device 20, the video content may either be streamed from the mobile device 20 to the set-top box or the set-top box may obtain the video content from another source (e.g., the television network or an Internet based streaming video service).

As a final variation, while the discussion herein focuses on transferring display between the mobile device 20 and one of the renderers 14, the present disclosure is not limited thereto. In another embodiment, display may be transferred between two mobile devices 20. The two mobile devices 20 may also operates as renderers 14 in the system 10 such that they are enabled to display content from any one of the media controllers 12 or display content that is accessible to them from local storage or one or more remote sources. In this case, one mobile device 20 may initiate the transfer process and detect the other mobile device 20 using fiduciary markers, Bluetooth® discovery, location and direction, or the like. The mobile device 20 may then send a transfer request to the media broker 16 in the manner described above where the other mobile device 20 is treated in the same manner as the desired renderer 14 described above. Alternatively, the mobile device 20 may send the transfer request directly to the other mobile device 20. In this case, for transfer of display from the other mobile device 20, the other mobile device 20 may stream the video content to the mobile device 20 such that transfer of display of the video content is seamless. For transfer of display to the other mobile device 20, the mobile device 20 may stream the video content to the other mobile device 20 such that transfer of display of the video content is seamless.

The following uses cases illustrate some of the concepts described herein. Note, however, that these use cases are exemplary and are not intended to limit the scope of the present disclosure.

Use Case 1:

1. John is watching a very exciting basketball game on TV with his family, but wants to get a drink from the fridge.

2. John does not want to pause playback because he is superstitious about watching live shows, but is very parched.

3. John decides to try out the new feature in his home entertainment center, and so he pulls out his smart phone.

4. John opens his smart phone's video player and selects "transfer video" on the opening menu.

5. John points his smart phone's camera at the TV and waits for it to recognize the TV.

6. His smart phone recognizes the TV and the media broker 16 transfers display of the basketball game to his smart phone.

7. John is able to walk into the kitchen and continue watching the basketball game on his smart phone.

8. John returns to the living room and turns off his smart phone since the basketball game was never interrupted, which his family greatly appreciated.

9. Later on in the game, John transfers the video again to his smart phone so that he can continue watching the game as he gets a snack.

10. When he is in the kitchen this time an important basket is made and John uses his smart phone to review the play several times using a DVR functionality provided either by the media controller 12 delivering the basketball game to his smart phone or the media broker 16. When John gets back to the TV, he is now out of synch with the live game.

11. John asks those in the room if he can now synch the main screen with what is on his smart phone—he is time shifted to 4 minutes earlier in the game when the big play occurred.

12. The rest of the family agrees to this, and John makes a simple gesture from his smart phone to the TV and display is transferred such that playback returns to the earlier time in the game that John was watching on his smart phone.

Use Case 2:

1. Jill is at home watching TV in her kitchen while she's making dinner.

2. An important local news story is being shown so she focuses in on watching it.

3. Although the feed is in high definition the TV is too small to see any details of the live coverage, so Jill wants to go into the other side of the house to watch it on the large screen.

4. Since she doesn't want to miss anything Jill pulls out her tablet and opens the video watching application.

5. Jill selects the "transfer from proximity" option, and in a second the device determines (using Bluetooth) that the closest active video device is the kitchen TV and sends a transfer request to the media broker 16 to transfer display of the program to Jill's tablet.

6. The program begins streaming to Jill's tablet over the WiFi network.

7. Jill turns off the kitchen TV and watches the content on her tablet while she walks into the living room.

8. As Jill gets into the living room she clicks "transfer to proximity" on her tablet. Since her TV is new and has a Bluetooth® device, the tablet determines that the living room TV is the renderer 14 to which Jill wants to transfer display.

9. The media broker 16 effects transfer of display of the program to the living room TV.

10. Jill sits down and turns off her tablet to watch the news coverage.

Those skilled in the art will recognize improvements and modifications to the preferred embodiments of the present disclosure. All such improvements and modifications are considered within the scope of the concepts disclosed herein and the claims that follow.

What is claimed is:

1. A method of operation of a mobile device comprising:
    receiving user input that initiates transfer of display of video content rendered to the mobile device from a desired renderer located proximate to the mobile device;
    automatically detecting the desired renderer, wherein automatically detecting the desired renderer comprises:
        obtaining a location of the mobile device; and
        obtaining a direction that the mobile device is pointing while the mobile device is pointed toward the desired renderer;
        wherein the desired renderer is enabled to be indentified from a plurality of renderers based on the location of the mobile device and the direction that the mobile device is pointing while the mobile device is pointed toward the desired renderer; and
    causing transfer of display of the video content to the mobile device from the desire renderer located proximate to the mobile device.

2. The method of claim 1 wherein automatically detecting the desired renderer comprises obtaining an identifier of the desired renderer via a local wireless discovery process.

3. The method of claim 1 wherein automatically detecting the desired renderer comprises:
    obtaining identifiers of two or more renderers within a local wireless communication range of the mobile device in the direction the mobile device is pointing; and
    selecting one of the two or more renderers having a highest strength of signal indicator as the desired renderer.

4. The method of claim 1 wherein automatically detecting the desired renderer comprises:
    obtaining identifiers of two or more renderers within a local wireless communication range of the mobile device in the direction the mobile device is pointing;
    utilizing a digital camera of the mobile device as a digital range finder to approximate a distance between the mobile device and the desired renderer; and
    selecting one of the two or more renderers having a strength of signal indicator that corresponds to the distance between the mobile device and the desired renderer as the desired renderer.

5. The method of claim 1 wherein causing transfer of display of the video content to the mobile device from the desired renderer located proximate to the mobile device comprises sending a transfer request to a centralized media broker for a system that comprises a plurality of renderers and a plurality of media controllers, the transfer request comprising information that enables the centralized media broker to identify one of the plurality of renderers as the desired renderer.

6. The method of claim 5 wherein causing transfer of display of the video content to the mobile device from the desired renderer located proximate to the mobile device further comprises:
    receiving a response from the centralized media broker, the response comprising information identifying a media controller of the plurality of media controllers that provides the video content to the desired renderer for display at the desired renderer;
    sending a request to the media controller for the video content; and
    receiving the video content from the media controller in response to the request starting at a point in playback of the video content corresponding to a point in playback of the video content being displayed at the desired renderer at a time of sending the transfer request to the centralized media broker.

7. The method of claim 5 wherein causing transfer of display of the video content to the mobile device from the desired renderer located proximate to the mobile device further comprises:
    receiving a response from the centralized media broker, the response comprising information identifying the video content, information identifying a point in playback of the video content being displayed at the desired renderer at a time of sending the transfer request, and information identifying a media controller of the plurality of media controllers from which the video content is accessible;
    sending a request to the media controller for the video content starting at the point in playback of the video content being displayed at the desired renderer at the time of sending the transfer request; and
    receiving the video content from the media controller in response to the request starting at the point in playback of the video content being displayed at the desired renderer at the time of sending the transfer request.

8. The method of claim 7 wherein the media controller is one of the plurality of media controllers other than a media controller that provides the video content to the desired renderer for display at the desired renderer.

9. The method of claim 1 wherein causing transfer of display of the video content to the mobile device from the desired renderer located proximate to the mobile device comprises:

sending a request to a media controller that is connected to the desired renderer and provides the video content to the desired renderer for display by the desired renderer; and receiving the video content from the media controller via a local wireless connection starting at a point in playback of the video content being displayed at the desired renderer at the time of sending the request.

10. A mobile device comprising:
a local wireless communication interface; and
a controller associated with the local wireless communication interface, adapted to:
  receive user input that initiates transfer of display of video content being rendered to the mobile device from a desired renderer located proximate to the mobile device;
  automatically detect the desired renderer, wherein automatically detecting the desired renderer comprises:
    obtaining a location of the mobile device; and
    obtaining a direction that the mobile device is pointing while the mobile device is pointed toward the desired renderer;
    wherein the desired renderer is enabled to be identified from a plurality of renderers based on the location of the mobile device and the direction that the mobile device is pointing while the mobile device is pointed toward the desired renderer; and
  cause transfer of display of the video content to the mobile device from the desired renderer located proximate to the mobile device.

11. A non-transitory computer readable medium storing software for instructing a controller of a mobile device to:
  receive user input that initiates transfer of display of video content being rendered to the mobile device from a desired renderer locate proximate to the mobile device;
  automatically detect the desired renderer, wherein automatically detecting the desired renderer comprises:
    obtaining a location of the mobile device; and
    obtaining a direction that the mobile device is pointing while the mobile device is pointed toward the desired renderer;
    wherein the desired renderer is enabled to be identified from a direction that the mobile device is pointing while the mobile device is pointed toward the desired renderer; and
  cause transfer of display of the video content to the mobile device from the desired renderer located proximate to the mobile device.

12. A method of operation of a mobile device comprising:
  receiving user input that initiates transfer of display of video content being rendered to the mobile device from a desired renderer located proximate to the mobile device
  automatically detecting the desired renderer, wherein automatically detecting the desired renderer comprises capturing a digital image of the desired renderer, wherein the desired renderer is enabled to be indentified via fiduciary markers of the desired renderer in the digital image; and
  causing transfer of display of the video content to the mobile device from the desired renderer located proximate to the mobile device.

13. A method of operation of a mobile device comprising:
  receiving user input that initiates transfer of display of video content being rendered from the mobile device to a desired renderer located proximate to the mobile device;
  automatically detecting the desired renderer, wherein automatically detecting the desired renderer comprises:
    obtaining a location of the mobile device; and
    obtaining a direction that the mobile device is pointing while the mobile device is pointed toward the desired renderer;
    wherein the desired renderer is enabled to be identified from a plurality of renderers based on the location of the mobile device and the direction that the mobile device is pointing while the mobile device is pointed toward the desired renderer; and
  causing transfer of display of the video content from the mobile device to the desired renderer located proximate to the mobile device.

14. The method of claim 13 wherein automatically detecting the desired renderer comprises obtaining an identifier of the desired renderer via a local wireless discovery process.

15. The method of claim 13 wherein automatically detecting the desired renderer comprises:
  obtaining identifiers of two or more renderers within a local wireless communication range of the mobile device in the direction the mobile device is pointing; and
  selecting one of the two or more renderers having a highest strength of signal Indicator as the desired renderer.

16. The method of claim 13 wherein automatically detecting the desired renderer comprises:
  obtaining identifiers of two or more renderers within a local wireless communication range of the mobile device in the direction the mobile device is pointing;
  utilizing a digital camera of the mobile device as a digital range finder to approximate a distance between the mobile device and the desired renderer; and
  selecting one of the two or more renderers having a strength of signal indicator that corresponds to the distance between the mobile device and the desired renderer as the desired renderer.

17. The method of claim 13 wherein causing transfer of display of the video content from the mobile device to the desired renderer located proximate to the mobile device comprises sending a transfer request to a centralized media broker for a system that comprises a plurality of renderers and a plurality of media controllers, the transfer request comprising information that enables the centralized media broker to identify one of the plurality of renderers as the desired renderer.

18. The method of claim 17 wherein the centralized media broker effects display of the video content at the desired renderer starting at a point in playback of the video content being displayed at the mobile device at a time of sending the transfer request to the centralized media broker.

19. The method of claim 13 wherein causing transfer of display of the video content from the mobile device to the desired renderer located proximate to the mobile device comprises:
  streaming the video content to one of a group consisting of:
    a media controller connected to the desired renderer and the desired renderer via a local wireless connection such that display of the video content starts at the desired renderer at a point in playback of the video content being displayed at the mobile device at a time the transfer was initiated.

20. A mobile device comprising:
a local wireless communication interface; and
a controller associated with the local wireless communication interface, adapted to:
  receive user input that initiates transfer of display of video content from the mobile device to a desired renderer located proximate to the mobile device;

automatically detect the desired renderer, wherein automatically detecting the desired renderer comprises:
obtaining a location of the mobile device; and
obtaining a direction that the mobile device is pointing while the mobile device is pointed toward the desired renderer;
wherein the desired renderer is enabled to be identified from a plurality of renderers based on the location of the mobile device and the direction that the mobile device is pointing while the mobile device is pointed toward the desired renderer; and
cause transfer of display of the video content from the mobile device to the desired renderer located proximate to the mobile device.

21. A non-transitory computer readable medium storing software for instructing a controller of a mobile device to:
receive user input that initiates transfer of display of video content being rendered from the mobile device to a desired renderer located proximate to the mobile device;
automatically detecting the desired renderer, wherein automatically detecting the desired rendered comprises:
obtaining a location of the mobile device; and
obtaining a direction that the mobile device is pointing while the mobile device is pointed toward the desired renderer;
wherein the desired renderer is enabled to be identified from a plurality of renderers based on the location of the mobile device and the direction that the mobile device is pointing while the mobile device is pointed toward the desired renderer; and
cause transfer of display of the video content from the mobile device to the desired renderer located proximate to the mobile device.

22. A method of operation of a mobile device comprising:
receiving user input that initiates transfer of display of video content being rendered from the mobile device to a desired renderer located proximate to the mobile device;
automatically detecting the desired renderer, wherein automatically detecting the desired rendered comprises capturing a digital image of the desired renderer, wherein the desired renderer is enabled to be identified via fiduciary markers of the desired renderer in the digital image; and
causing transfer of display of the video content from the mobile device to the desired renderer located proximate to the mobile device.

* * * * *